United States Patent
Ando et al.

(10) Patent No.: US 10,514,156 B2
(45) Date of Patent: Dec. 24, 2019

(54) LUMINAIRE

(71) Applicant: PANASONIC INTELLECTUAL PROPERTY MANAGEMENT CO., LTD., Osaka (JP)

(72) Inventors: Tamotsu Ando, Osaka (JP); Hajime Ozaki, Kyoto (JP); Tatsumi Setomoto, Osaka (JP); Kohji Hiramatsu, Osaka (JP); Tomokazu Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 15/952,693

(22) Filed: Apr. 13, 2018

(65) Prior Publication Data
US 2018/0306423 A1 Oct. 25, 2018

(30) Foreign Application Priority Data
Apr. 25, 2017 (JP) .................................. 2017-086235

(51) Int. Cl.
*F21V 23/04* (2006.01)
*F21V 15/01* (2006.01)
(Continued)

(52) U.S. Cl.
CPC ............ *F21V 23/0435* (2013.01); *F21S 8/04* (2013.01); *F21V 7/10* (2013.01); *F21V 15/01* (2013.01);
(Continued)

(58) Field of Classification Search
None
See application file for complete search history.

(56) References Cited

U.S. PATENT DOCUMENTS 8,436,556 B2 * 5/2013 Eisele ................ H05B 33/0857
315/307
8,901,825 B2 * 12/2014 Reed .................. H05B 37/0218
315/149

(Continued)

FOREIGN PATENT DOCUMENTS

JP 2004-302974 10/2004
JP 2008-204926 9/2008

(Continued)

*Primary Examiner* — Dion Ferguson
*Assistant Examiner* — Srinivas Sathiraju
(74) *Attorney, Agent, or Firm* — Greenblum & Bernstein, P.L.C.

(57) ABSTRACT

A luminaire is provided. The luminaire includes a luminaire body and a first wireless communication device. The first wireless communication device receives a first control signal wirelessly transmitted from an outside of the luminaire body, and wirelessly transmits a second control signal in response to the first control signal. The luminaire body includes: a light source; a second wireless communication device that receives the second control signal; a light emission control circuit that is electrically connected to the second wireless communication device and controls a light emission state of the light source according to the second control signal; and a case that, with or without a cover, houses the second wireless communication device and the light emission control circuit. The first wireless communication device is attached to the luminaire body.

18 Claims, 8 Drawing Sheets

(51) Int. Cl.

| | | |
|---|---|---|
| *F21V 23/02* | (2006.01) | |
| *F21V 23/00* | (2015.01) | |
| *H02J 7/02* | (2016.01) | |
| *H02J 7/35* | (2006.01) | |
| *F21S 8/04* | (2006.01) | |
| *F21V 7/10* | (2006.01) | |
| *H02J 50/20* | (2016.01) | |
| *F21Y 115/10* | (2016.01) | |

(52) U.S. Cl.
CPC ............ *F21V 23/003* (2013.01); *F21V 23/02* (2013.01); *H02J 7/025* (2013.01); *H02J 7/35* (2013.01); *F21Y 2115/10* (2016.08); *H02J 50/20* (2016.02)

(56) References Cited

U.S. PATENT DOCUMENTS

| | | | | |
|---|---|---|---|---|
| 9,040,947 B2* | 5/2015 | Trewin | ..................... | H02J 5/005 |
| | | | | 250/551 |
| 9,131,552 B2* | 9/2015 | Reed | ................. | H05B 33/0854 |
| 9,157,618 B2* | 10/2015 | Holland | ................ | F21V 21/096 |
| 9,184,497 B2* | 11/2015 | Chen | ........................ | H01Q 1/38 |
| 9,587,805 B2* | 3/2017 | Ryu | ..................... | F21V 29/767 |
| 9,713,228 B2* | 7/2017 | Reed | ................. | H05B 37/0218 |
| 9,835,318 B2* | 12/2017 | Ando | ................... | F21V 23/023 |
| 9,877,377 B2* | 1/2018 | Ando | ................. | H05B 33/0845 |
| 9,956,673 B2* | 5/2018 | Yokoyama | .......... | B25B 23/1425 |
| 9,961,750 B2* | 5/2018 | Leinen | ............... | H05B 37/0272 |
| 10,036,549 B2* | 7/2018 | Simon | ................ | F21V 33/0052 |
| 10,123,399 B2* | 11/2018 | Ando | ........................ | F21S 9/04 |
| 10,177,435 B2* | 1/2019 | Setomoto | ............... | H01Q 15/24 |
| 10,201,063 B2* | 2/2019 | Leinen | ............... | H05B 37/0272 |
| 10,211,660 B2* | 2/2019 | Underwood | .............. | G06T 7/20 |
| 2013/0312804 A1* | 11/2013 | Akieda | ................... | H02S 10/10 |
| | | | | 136/205 |
| 2014/0265882 A1* | 9/2014 | Laski | ................. | H05B 33/0854 |
| | | | | 315/158 |
| 2014/0368115 A1* | 12/2014 | Ando | ................. | H05B 37/0272 |
| | | | | 315/129 |
| 2015/0173157 A1* | 6/2015 | Setomoto | ........... | H05B 37/0227 |
| | | | | 315/153 |
| 2016/0279770 A1* | 9/2016 | Yokoyama | .......... | B25B 23/1425 |
| 2016/0320036 A1* | 11/2016 | Clark | ...................... | F21V 15/01 |
| 2016/0380474 A1* | 12/2016 | Nakai | ................... | H01M 10/465 |
| | | | | 320/101 |
| 2017/0012464 A1* | 1/2017 | Sant'Anselmo | ........ | F03D 9/007 |
| 2017/0064551 A1* | 3/2017 | Block | ...................... | G06F 21/74 |
| 2017/0122540 A1* | 5/2017 | Dull | .......................... | F21S 4/28 |
| 2017/0167675 A1* | 6/2017 | Katona | ...................... | F21S 8/06 |
| 2017/0184560 A1* | 6/2017 | Crescini | ................ | G01D 11/00 |
| 2017/0309987 A1* | 10/2017 | Setomoto | ............... | H01Q 15/24 |
| 2017/0322364 A1* | 11/2017 | Girotto | ................. | G02B 6/0076 |
| 2017/0339772 A1 | 11/2017 | Ozaki et al. | | |
| 2018/0091222 A1 | 3/2018 | Arai | | |
| 2018/0092192 A1 | 3/2018 | Arai | | |
| 2018/0306423 A1* | 10/2018 | Ando | ................. | F21V 23/0435 |
| 2019/0021154 A1* | 1/2019 | Sadwick | ............. | F21V 23/0471 |

FOREIGN PATENT DOCUMENTS

| | | |
|---|---|---|
| JP | 2014-093670 | 5/2014 |
| JP | 2017-010848 | 1/2017 |
| WO | 2013/129575 | 9/2013 |

\* cited by examiner

LUMINAIRE

CROSS REFERENCE TO RELATED APPLICATION

This application claims the benefit of priority of Japanese Patent Application Number 2017-086235 filed on Apr. 25, 2017, the entire content of which is hereby incorporated by reference.

BACKGROUND

1. Technical Field

The present disclosure relates to luminaires having a wireless communication function.

2. Description of the Related Art

Luminaires having a wireless communication function are conventionally known. For example, Patent Literature (PTL) 1 (Japanese Unexamined Patent Application Publication No. 2017-10848) discloses a luminaire with improved wireless communication reliability.

SUMMARY

Luminaires having a wireless communication function may not be capable of ensuring necessary wireless communication performance because, for example, the luminaires are installed in a place that is difficult for wireless communication signals to reach.

The present disclosure provides a luminaire capable of improving wireless communication performance.

A luminaire according to one aspect of the present disclosure includes: a luminaire body; and a first wireless communication device that receives a first control signal wirelessly transmitted from an outside of the luminaire body, and wirelessly transmits a second control signal in response to the first control signal. The luminaire body includes: a light source; a second wireless communication device that receives the second control signal wirelessly transmitted by the first wireless communication device; a light emission control circuit that is electrically connected to the second wireless communication device, and controls a light emission state of the light source according to the second control signal received by the second wireless communication device; and a case, with or without a cover, that houses the second wireless communication device and the light emission control circuit. The first wireless communication device is attached to the luminaire body.

According to the present disclosure, it is possible to provide a luminaire capable of improving wireless communication performance.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments will be described in detail with reference to the drawings. It should be noted that the embodiments described below each represent a generic or specific example. The numerical values, shapes, materials, structural components, the arrangement and connection of the structural components, etc. shown in the following embodiments are mere examples, and are not intended to limit the scope of the present disclosure. Furthermore, among the structural components in the following embodiments, structural components not recited in any one of the independent claims which indicate the broadest concepts are described as optional structural components.

It should be noted that the figures are schematic diagrams and are not necessarily precise illustrations. Furthermore, in the figures, substantially identical components are assigned the same reference signs, and overlapping description may be omitted or simplified. Moreover, in the following embodiments, a plan view means viewing from a direction perpendicular to a principal surface of a substrate included in a light source.

Embodiment 1

[Configuration of Luminaire]

Figure 1:
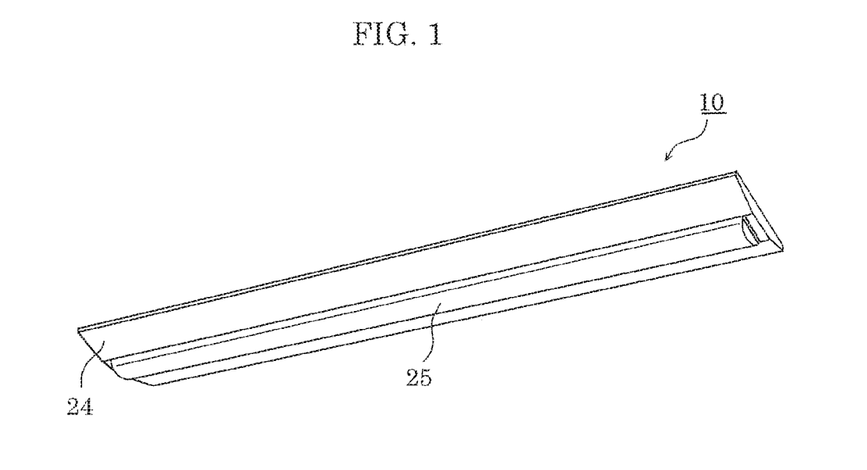
FIG. 1 is an external perspective view of a luminaire according to Embodiment 1.
Figure 2:
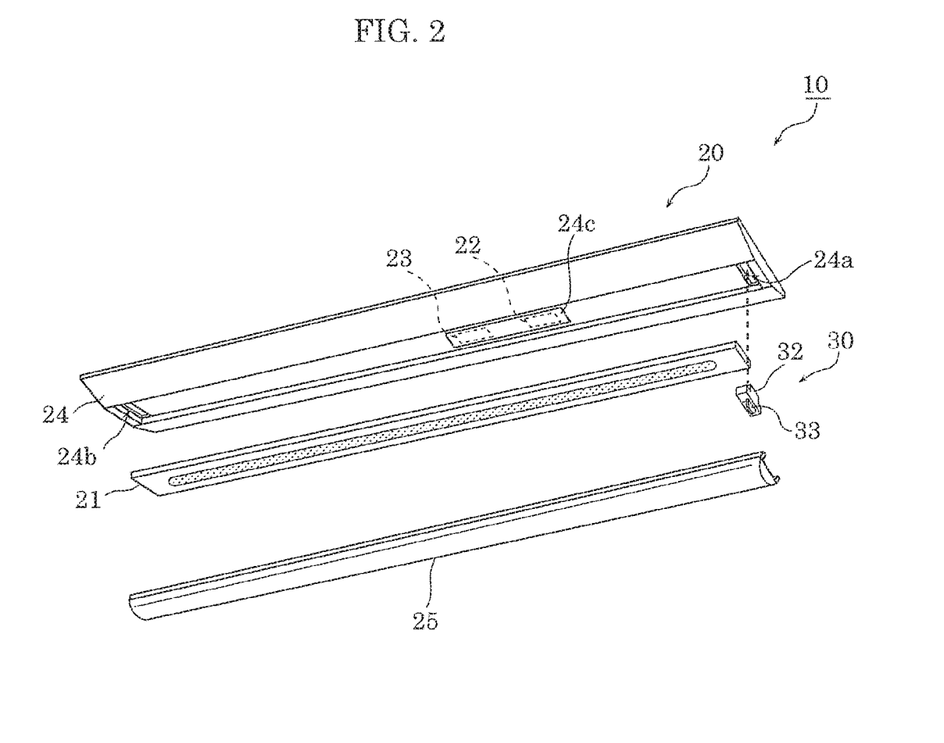
FIG. 2 is an exploded perspective view of the luminaire according to Embodiment 1.
Figure 3:
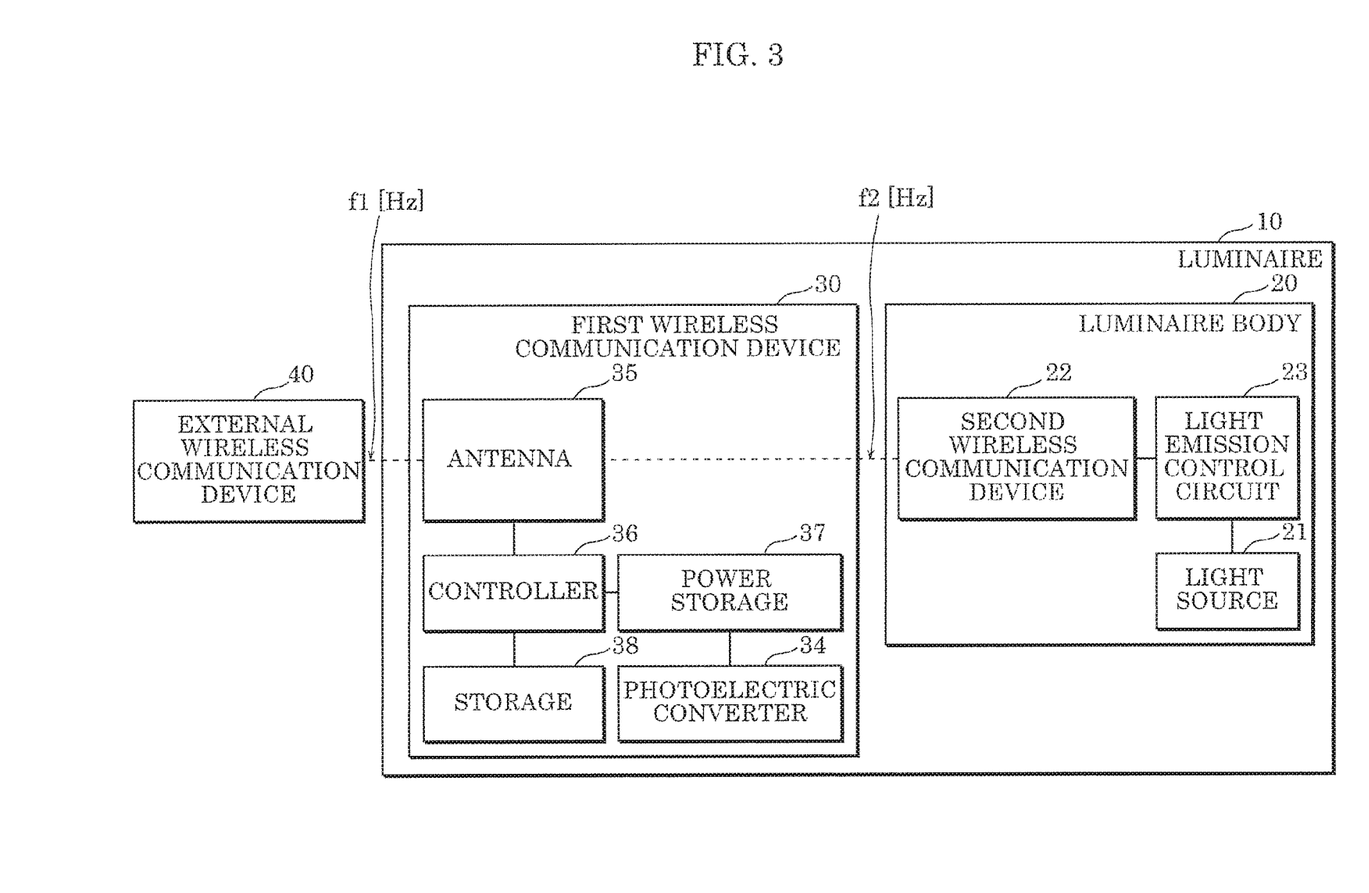
FIG. 3 is a block diagram illustrating a functional configuration of the luminaire according to Embodiment 1.

The following describes a configuration of a luminaire according to Embodiment 1. FIG. 1 is an external perspective view of the luminaire according to Embodiment 1. FIG. 2 is an external perspective view of the luminaire according to Embodiment 1. FIG. 3 is a block diagram illustrating a functional configuration of the luminaire according to Embodiment 1. It should be noted that FIG. 3 also shows external wireless communication device 40. External wireless communication device 40 is used as a remote control for luminaire 10 according to Embodiment 1, and is operated by, for example, a user.

Luminaire 10 shown in FIG. 1 to FIG. 3 is an elongated luminaire that is attached to a part of a building, such as a ceiling, and illuminates a room. Luminaire 10 includes luminaire body 20 and first wireless communication device 30. When first wireless communication device 30 wirelessly receives a first control signal wirelessly transmitted from external wireless communication device 40, luminaire 10 emits light according to the first control signal. Specifically, light emission control circuit 23 turns on, turns off, or dims light source 21 according to the first control signal.

Here, luminaire 10 has a structure in which first wireless communication device 30 is removably (detachably) attached to luminaire body 20, and the user can change the position of first wireless communication device 30. Although, as illustrated in FIG. 2, first wireless communication device 30 is attached to, for example, recess portion 24a at one end of elongated case 24, the user can also attach first wireless communication device 30 to recess portion 24b at the other end of case 24. Each of recess portion 24a and recess portion 24b is an exemplary attachment structure.

Because the structure enables the attachment of first wireless communication device 30 to portions of luminaire body 20, it is possible to attach first wireless communication device 30 to a position that successfully ensures necessary performance for wireless communication between external wireless communication device 40 and luminaire 10.

Here, luminaire body 20 and first wireless communication device 30 are connected wirelessly, not by wire. Specifically, first wireless communication device 30 performs wireless communication with second wireless communication device 22 electrically connected to light emission control circuit 23. Light emission control circuit 23 transmits, to second wireless communication device 22, a second control signal in response to the first control signal received from external wireless communication device 40, and controls light emission of light source 21 according to the second control signal received by second wireless communication device 22. Because luminaire body 20 and first wireless communication device 30 are connected wirelessly as above, it is possible to increase flexibility in the position of first wireless communication device 30. In what follows, a specific configuration of such luminaire 10 will be described.

[Configuration of First Wireless Communication Device]

Figure 4:
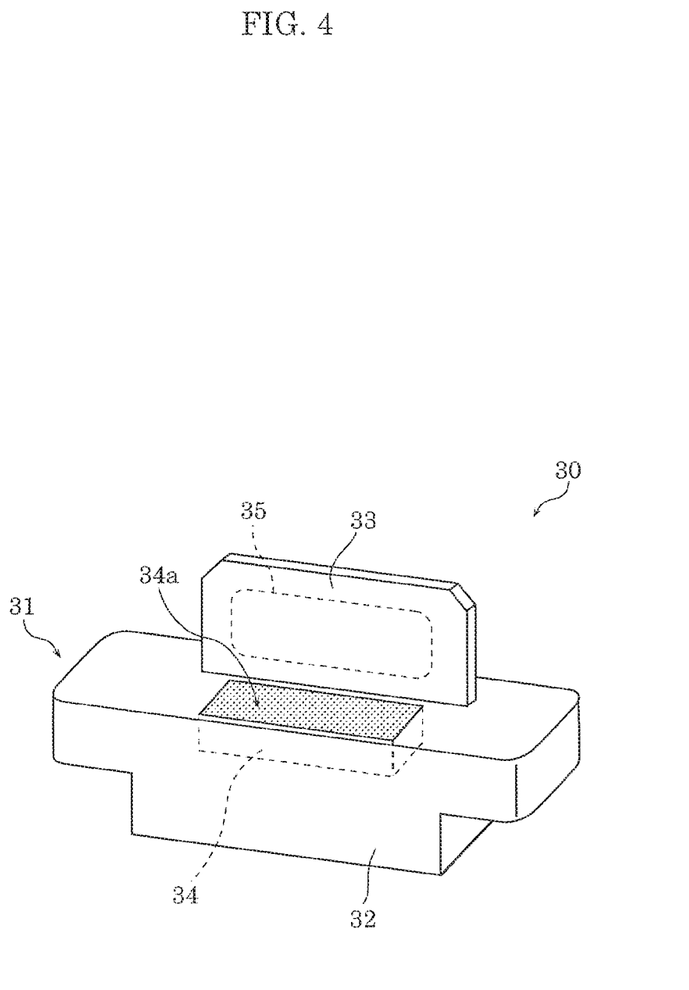
FIG. 4 is an external perspective view of a first wireless communication device.

First, the following describes a configuration of first wireless communication device 30 with reference to FIG. 4 in addition to FIG. 1 to FIG. 3. FIG. 4 is an external perspective view of first wireless communication device 30.

First wireless communication device 30 is a wireless communication module that wirelessly receives the first control signal wirelessly transmitted from external wireless communication device 40 (the outside of luminaire body 20), and wirelessly transmits the second control signal in response to the first control signal. In other words, first wireless communication device 30 functions as a relay device for control signal. First wireless communication device 30 is removably (detachably) attached to luminaire body 20. Although first wireless communication device 30 is attached to case 24 of luminaire body 20, first wireless communication device 30 may be attached to a portion of luminaire body 20 other than case 24.

Specifically, first wireless communication device 30 includes housing body 31, protrusion portion 32, light reflector 33, photoelectric converter 34, antenna 35, controller 36, power storage 37, and storage 38. First wireless communication device 30 has no light source for illumination.

Housing body 31 is an outer housing of first wireless communication device 30 that houses photoelectric converter 34, antenna 35, controller 36, power storage 37, and storage 38. Housing body 31 has a substantially rectangular parallelepiped shape, and is made of, for example, a white resin material having insulation properties.

Protrusion portion 32 is inserted into one of recess portion 24a and recess portion 24b of case 24. In other words, protrusion portion 32 is insertably attached to one of recess portion 24a and recess portion 24b. Protrusion portion 32 is a portion that protrudes from housing body 31, and is integrally formed with housing body 31 in first wireless communication device 30. Protrusion portion 32 may be formed independently of housing body 31 and attached to housing body 31. When protrusion portion 32 is integrally formed with housing body 31, part of photoelectric converter 34, antenna 35, controller 36, power storage 37, and storage 38 may be disposed inside protrusion portion 32.

It should be noted that although protrusion portion 32 is used for structural connection of first wireless communication device 30, protrusion portion 32 is not used for electrical connection. In other words, the structural components of first wireless communication device 30 and the structural components of luminaire body 20 are not electrically connected because of the structural connection between protrusion portion 32 and recess portion 24a (or recess portion 24b).

Photoelectric converter 34 is an exemplary power generator, and is an element that converts light energy into electrical energy using an organic thin film etc. Photoelectric converter 34 has light-receiving surface 34a, and is disposed inside housing body 31 to expose light-receiving surface 34a to the outside of housing body 31. It should be noted that it is not necessary that light-receiving surface 34a is exposed, and light-receiving surface 34a may be covered with, for example, a light-transmissive cover. Light-receiving surface 34a may be viewable from the outside of housing body 31 so that light enters light-receiving surface 34a. In other words, housing body 31 may house photoelectric converter 34 in a state in which light-receiving surface 34a of photoelectric converter 34 is viewable from the outside of housing body 31.

It should be noted that first wireless communication device 30 may include, as a power generator, a thermoelectric converter that converts thermal energy into electrical energy, such as a Peltier element having the Peltier effect, instead of photoelectric converter 34. In this case, the thermoelectric converter may convert heat generated by light source 21 emitting light, into electrical power.

Light reflector 33 reflects light to light-receiving surface 34a. Specifically, light reflector 33 is plate-shaped and erected on a surface opposite to protrusion portion 32 of housing body 31. Light reflector 33 is made of, for example, a white resin material. Light reflector 33 may be integrally formed with housing body 31 or may be formed independently of housing body 31 and attached to housing body 31. In addition, a surface treatment such as mirror finishing may be performed on light reflector 33.

Figure 5:
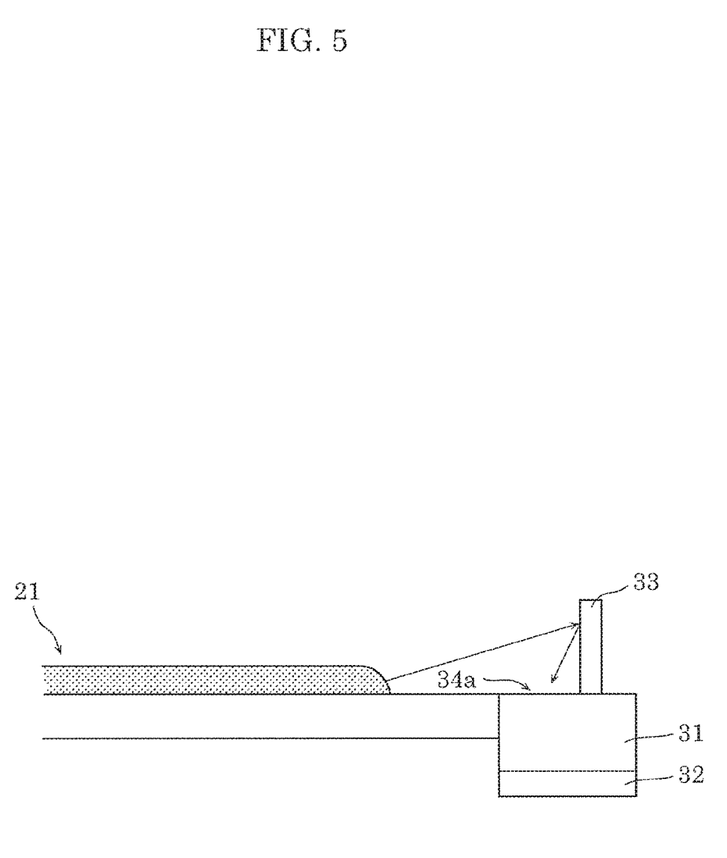
FIG. 5 is a side view for illustrating an example in which a light reflector reflects light emitted by a light source to a light-receiving surface.

As illustrated in FIG. 5, light-receiving surface 34a is between light source 21 and light reflector 33 in a side view (or in a plan view). Accordingly, light reflector 33 is capable of reflecting light emitted by light source 21 to light-receiving surface 34a. FIG. 5 is a side view for illustrating an example in which light reflector 33 reflects light emitted by light source 21 to light-receiving surface 34a.

It should be noted that it is not necessary that light reflector 33 reflects the light emitted by light source 21 to light-receiving surface 34a, and light reflector 33 may reflect light other than the light emitted by light source 21 to light-receiving surface 34a. For example, when luminaire 10 is installed outdoors, light reflector 33 may reflect sunlight to light-receiving surface 34a.

Power storage 37 is a power source of first wireless communication device 30, and stores electrical power generated by photoelectric converter 34 (power generator) and supplies electrical power to controller 36 etc. Power storage 37 is a secondary battery such as a lithium-ion battery or a nickel hydride battery, but may be a capacitor such as an electric double-layer capacitor (EDLC).

Antenna 35 receives the first control signal from external wireless communication device 40, and transmits the second control signal to second wireless communication device 22. Specifically, antenna 35 is an antenna module including a chip antenna or a pattern antenna etc., receives the first control signal transmitted through radio waves having carrier frequency f1 from external wireless communication device 40, and transmits the second control signal through radio waves having carrier frequency f2. A carrier frequency is also referred to as the frequency of a carrier wave. It should be noted that when an antenna for receiving the first control signal and an antenna for transmitting the second control signal are separate antennas, antenna 35 includes the antennas.

Although the position of antenna 35 is not particularly limited, antenna 35 is housed inside light reflector 33 in first wireless communication device 30. In other words, light reflector 33 contains antenna 35. As stated above, because, in first wireless communication device 30, light reflector 33 is a portion that protrudes toward a side facing the room, containing antenna 35 in such a portion produces an effect of easily ensuring communication performance of antenna 35.

Controller 36 performs communication control for wirelessly transmitting the second control signal in response to the first control signal received by antenna 35. Controller 36 generates the second control signal from the first control signal, and wirelessly transmits the generated second control signal using antenna 35. The second control signal is, for example, a control signal generated from the first control signal by converting carrier frequency f1 of the first control signal into carrier frequency f2. Although controller 36 is implemented by, for example, a microcomputer, controller 36 may be implemented by a processor or a dedicated circuit.

Storage 38 is a storage device that stores a control program etc. of controller 36. Storage 38 is implemented by a semiconductor memory etc.

As described above, first wireless communication device 30 is removably (detachably) attached to luminaire body 20. Accordingly, when wireless communication performance between external wireless communication device 40 and first wireless communication device 30 is low, the user can improve the wireless communication performance between external wireless communication device 40 and first wireless communication device 30 by detaching first wireless communication device 30 and attaching first wireless communication device 30 to another place.

Moreover, when first wireless communication device 30 is separate from luminaire body 20, a method for supplying electrical power to first wireless communication device 30 becomes problematic. In luminaire 10, this problem is solved by first wireless communication device 30 including power storage 37.

Furthermore, if first wireless communication device 30 includes photoelectric converter 34, photoelectric converter 34 converts light emitted by light source 21 into electrical power (electrical energy), and the electrical power resulting from the conversion is stored in power storage 37, it is possible to cause first wireless communication device 30 to efficiently operate by using the light emitted by light source.

It should be noted that controller 36 may perform an intermittent operation. Specifically, controller 36 may periodically perform a sleep operation. As a result, it is possible to reduce power consumption of first wireless communication device 30. It should be noted that in this case, the first control signal transmitted from external wireless communication device 40 when controller 36 is in a sleep state becomes invalid. To reduce the occurrence of such an error, external wireless communication device 40 may continuously transmit the first control signal or retry transmitting the first control signal when first wireless communication device 30 did not receive the first control signal. In other words, it is possible to reduce the occurrence of an error when controller 36 is in the sleep state, using communication standards.

[Configuration of Luminaire Body]

Next, the following describes a configuration of luminaire body 20 with reference to mainly FIG. 2 and FIG. 3. Luminaire body 20 is part of luminaire 10 from which first wireless communication device 30 is excluded. Luminaire body 20 includes light source 21, second wireless communication device 22, light emission control circuit 23, case 24, and light-transmissive cover 25. Luminaire body 20 is supplied with DC power from, for example, an electrical power system.

Second wireless communication device 22 is a wireless communication module that receives the second control signal wirelessly transmitted from first wireless communication device 30. Though not shown in detail, like first wireless communication device 30, second wireless communication device 22 includes, for example, an antenna that receives the second control signal; a controller that performs signal processing (e.g., demodulation processing) on the second control signal; and a storage that stores a control program executed by the controller.

Light emission control circuit 23 is electrically connected (connected by wire) to second wireless communication device 22, and controls a light emission state of light source 21 according to the second control signal received by second wireless communication device 22. Light emission control includes turning on, turning off, dimming, and toning of light source 21.

When the second control signal is a signal instructing turning on, light emission control circuit 23 converts AC power supplied from the electrical power system into DC power suitable for light source 21 to emit light, and supplies the DC power. Moreover, when the second control signal is a signal instructing turning off, light emission control circuit 23 stops power supply to light source 21. Furthermore, when the second control signal is a signal instructing dimming, light emission control circuit 23 supplies DC power corresponding to a dimming level indicated by the second control signal, to light source 21.

Specifically, light emission control circuit 23 includes a substrate and circuit components mounted on the substrate. Examples of the circuit components include a capacitative element, such as an electrolytic capacitor or a ceramic capacitor, a resistance element, a coil element, a choke coil (choke transformer), a noise filter, a diode, a switching element, or an integrated circuit element (control IC for switching element).

Light source 21 is an elongated light-emitting module, and emits, for example, white light. Light source 21 is, for example, a COB light-emitting module, and is formed by sealing LEDs disposed along the longitudinal direction of an elongated substrate, in a line with a phosphor-containing resin. Light source 21 may be an SMD light-emitting module in which SMD LED elements are mounted on a substrate. Though not shown, light source 21 is electrically connected to light emission control circuit 23 by a cable with a connector etc.

The substrate of light source 21 is, for example, a resin substrate or a ceramic substrate. Since the substrate is made of a material having a relatively high radio wave transmittance, it is possible to produce the effect of easily ensuring wireless communication performance between first wireless communication device 30 and second wireless communication device 22.

Case 24 is an elongated part that houses second wireless communication device 22 and light emission control circuit 23. In addition, case 24 functions as a base for attaching light source 21 and as a heat sink for light source 21. Although case 24 is made of, for example, a metal such as aluminum, part or whole of case 24 may be made of a resin material. For example, in luminaire 10, portion 24c of case 24 opposite to second wireless communication device 22 (portion 24c of case 24 between second wireless communication device 22 and light source 21) is made of a resin material. Since portion 24c of case 24 opposite to second wireless communication device 22 is made of a resin material that transmits radio waves, it is possible to produce the effect of easily ensuring the wireless communication performance between first wireless communication device 30 and second wireless communication device 22. It should be noted that portion 24c opposite to second wireless communication device 22 may be made of a material having a relatively high radio wave transmittance other than the resin material, or may be an opening.

Recess portion 24a is provided at one end of case 24 in the longitudinal direction of case 24. In addition, recess portion 24b is provided at the other end of case 24 in the longitudinal direction. Each of recess portion 24a and recess portion 24b is an exemplary attachment structure, and protrusion portion 32 of first wireless communication device 30 can be inserted into (attached to) each of recess portion 24a and recess portion 24b.

Light-transmissive cover 25 makes up an outer shell of luminaire 10 and functions as an outlet for light from light source 21. Light-transmissive cover 25 is an elongated part and covers light source 21 and first wireless communication device 30. Light-transmissive cover 25 is made of, for example, a transparent resin material such as acrylic resin or a polycarbonate resin, and transmits the light emitted by light source 21. As long as light-transmissive cover 25 is light transmissive, light-transmissive cover 25 may be made of glass etc. Light-transmissive cover 25 is made of a material that transmits radio waves.

Moreover, light-transmissive cover 25 has a function (light-dispersing function) of dispersing the light emitted by light source 21. For example, light-transmissive cover 25 achieves the light-dispersing function by containing a light-dispersing material such as silica. It should be noted that light-transmissive cover 25 may not have the light-dispersing function.

The configuration in which light-transmissive cover 25 covers first wireless communication device 30 attached to the end of case 24 makes it harder for the light of light source 21 to reach the ends of light-transmissive cover 25, and thus the ends of light-transmissive cover 25 may get dark. If, as stated above, housing body 31 and light reflector 33 have a white color having a relatively high light reflectivity, it is possible to reduce a possibility that the ends of light-transmissive cover 25 get dark.

It should be noted that first wireless communication device 30 need not be covered by light-transmissive cover 25. In other words, recess portion 24a and recess portion 24b may be not covered by light-transmissive cover 25, and may be exposed to the outside. In this case, the user can attach first wireless communication device 30 to luminaire body 20 without uncovering light-transmissive cover 25.

As described above, case 24 of luminaire body 20 includes the recess portions, the attachment structures, to each of which protrusion portion 32 of first wireless communication device 30 is configured to be removably attached. As a result, the user can select an attachment position of first wireless communication device 30 from among the attachment positions. In other words, the user can attach first wireless communication device 30 in a position which allows the wireless communication performance of first wireless communication device 30 to be relatively improved.

It should be noted that the attachment structures may be provided to the structural components of luminaire body 20 other than case 24. In addition, luminaire body 20 may include only one attachment structure. Even in this case, if first wireless communication device 30 is removably attached to luminaire body 20, the user can try to improve the wireless communication performance of first wireless communication device 30 by removing first wireless communication device 30 from luminaire body 20 and attaching first wireless communication device 30 to the outside of luminaire 10 such as a ceiling or a wall.

In addition, luminaire body 20 need not include the attachment structures. It is sufficient that at least one of luminaire body 20 and first wireless communication device 30 has an attachment structure for detachably attaching first wireless communication device 30 to luminaire body 20. For example, if first wireless communication device 30 has a magnet as the attachment structure, the user can attach and remove first wireless communication device 30 to and from a metal portion of luminaire body 20. In other words, even if luminaire body 20 has no attachment structure, the user can change the attachment position of first wireless communication device 30.

[Carrier Frequency]

In luminaire 10, carrier frequency f1 of the first control signal is different from carrier frequency f2 of the second control signal. In consequence, it is possible to reduce interference (radio interference) between a carrier wave of the first control signal and a carrier wave of the second control signal.

Here, for example, if carrier frequency f1 of the first control signal is lower than carrier frequency 12 of the second control signal, it is possible to make a first communicable distance between external wireless communication device 40 and first wireless communication device 30 greater than a second communicable distance between first wireless communication device 30 and second wireless communication device 22, by reducing free-space path loss of carrier frequency f1 of the first control signal.

Specifically, for example, carrier frequency f1 is a frequency in a 920 MHz band (Sub-GHz band), and carrier frequency f2 is a frequency in a 2.4 GHz band. Moreover, carrier frequency f1 may be a frequency in 920 MHz band, and carrier frequency 2 may be a frequency in a millimeter band (a frequency band of at least 30 GHz and at most 300 GHz).

In contrast, if the first communicable distance is made less than the second communicable distance, carrier frequency f1 of the first control signal may be higher than carrier frequency f2 of the second control signal. Here, if near-field communication such as weak radio communication using radio waves of a frequency in a 315 MHz band is used for transmitting the second control signal, it is possible to make carrier frequency f1 of the first control signal higher than carrier frequency f2 of the second control signal, and the first communicable distance greater than the second communicable distance.

In this case, for example, carrier frequency f1 is a frequency in the 920 MHz band, and carrier frequency f2 is a frequency in the 315 MHz band. In this case, near-field communication such as weak radio communication using radio waves of a frequency in the 315 MHz band has a narrow range of radio waves, and thus it is possible to reduce the interference between the carrier wave of the first control signal and the carrier wave of the second control signal. It should be noted that such near-field communication is effective when specific luminaire 10 among luminaires 10 and external wireless communication device 40 are paired.

Moreover, the first control signal may be transmitted through infrared rays or visible light, and the second control signal may be transmitted through radio waves. Accordingly, it is possible to reduce interference of radio waves with the carrier wave of the second control signal.

Advantageous Effects Etc

As described above, luminaire 10 includes: luminaire body 20; and first wireless communication device 30 that receives a first control signal wirelessly transmitted from an outside of luminaire body 20, and wirelessly transmits a second control signal in response to the first control signal. Luminaire body 20 includes: light source 21; second wireless communication device 22 that receives the second control signal wirelessly transmitted by first wireless communication device 30; light emission control circuit 23 that is electrically connected to second wireless communication device 22, and controls a light emission state of light source 21 according to the second control signal received by second wireless communication device 22; and case 24 that, with or without light-transmissive cover 25, houses second wireless communication device 22 and light emission control circuit 23. First wireless communication device 30 is attached to luminaire body 20. First wireless communication device 30 may be in an interior space of luminaire body 20 defined by case 24 and light-transmissive cover 25.

With this, if the user changes the attachment position of first wireless communication device 30, it is possible to improve the wireless communication performance of first wireless communication device 30. In other words, it is possible to provide luminaire 10 capable of improving wireless communication performance.

Moreover, first wireless communication device 30 may be removably attached to luminaire body 20.

With this, if the user removes first wireless communication device 30 and changes the attachment position of first wireless communication device 30, it is possible to improve the wireless communication performance of first wireless communication device 30. In other words, it is possible to provide luminaire 10 capable of improving wireless communication performance.

Moreover, luminaire body 20 may include attachment structures, to each of which first wireless communication device 30 is configured to be removably attached. For example, luminaire body 20 has, as attachment structures, recess portion 24a and recess portion 24b.

With this, the user can select an attachment position of first wireless communication device 30 from among the attachment positions. In other words, the user can attach first wireless communication device 30 in a position which allows the wireless communication performance of first wireless communication device 30 to be relatively improved.

Moreover, first wireless communication device 30 may include power storage 37 that is a power source of first wireless communication device 30.

With this, power storage 37 allows first wireless communication device 30 to operate.

Moreover, first wireless communication device 30 may include a power generator, and power storage 37 may store electrical power generated by the power generator.

With this, the power generator is capable of charging power storage 37 with generated electrical power.

Moreover, the power generator may be photoelectric converter 34.

With this, photoelectric converter 34 is capable of charging power storage 37 with light energy.

Moreover, first wireless communication device 30 may include housing body 31 that houses photoelectric converter 34 in a state in which light-receiving surface 34a of photoelectric converter 34 is viewable from an outside of housing body 31.

With this, photoelectric converter 34 can be housed in a state in which photoelectric converter 34 is capable of generating electrical power.

Moreover, first wireless communication device 30 may include light reflector 33 that reflects light to light-receiving surface 34a.

With this, light reflector 33 is capable of increasing an amount of electrical power generated by photoelectric converter 34, by reflecting light.

Moreover, first wireless communication device 30 may include antenna 35, and light reflector 33 may be plate-shaped, erected on housing body 31, and contain antennal element 35.

With this, since antenna element 35 is housed in a portion protruding from housing body 31, it is possible to produce an effect of easily ensuring communication performance of antenna 35.

Moreover, light reflector 33 reflects light emitted by light source 21 to light-receiving surface 34a.

With this, photoelectric converter 34 is capable of charging power storage 37, using the light emitted by light source 21.

Moreover, the power generator may be a thermoelectric converter.

With this, the thermoelectric converter is capable of charging power storage 37 with heat energy.

Moreover, carrier frequency f1 of the first control signal may be different from carrier frequency f2 of the second control signal.

With this, it is possible to reduce interference (radio interference) between a carrier wave of the first control signal and a carrier wave of the second control signal.

Moreover, carrier frequency f1 of the first control signal may be lower than carrier frequency f2 of the second control signal.

With this, it is possible to make a first communicable distance between external wireless communication device 40 and first wireless communication device 30 longer than a second communicable distance between first wireless communication device 30 and second wireless communication device 22.

Embodiment 2

Configuration of Luminaire According to Embodiment 2

Figure 6:
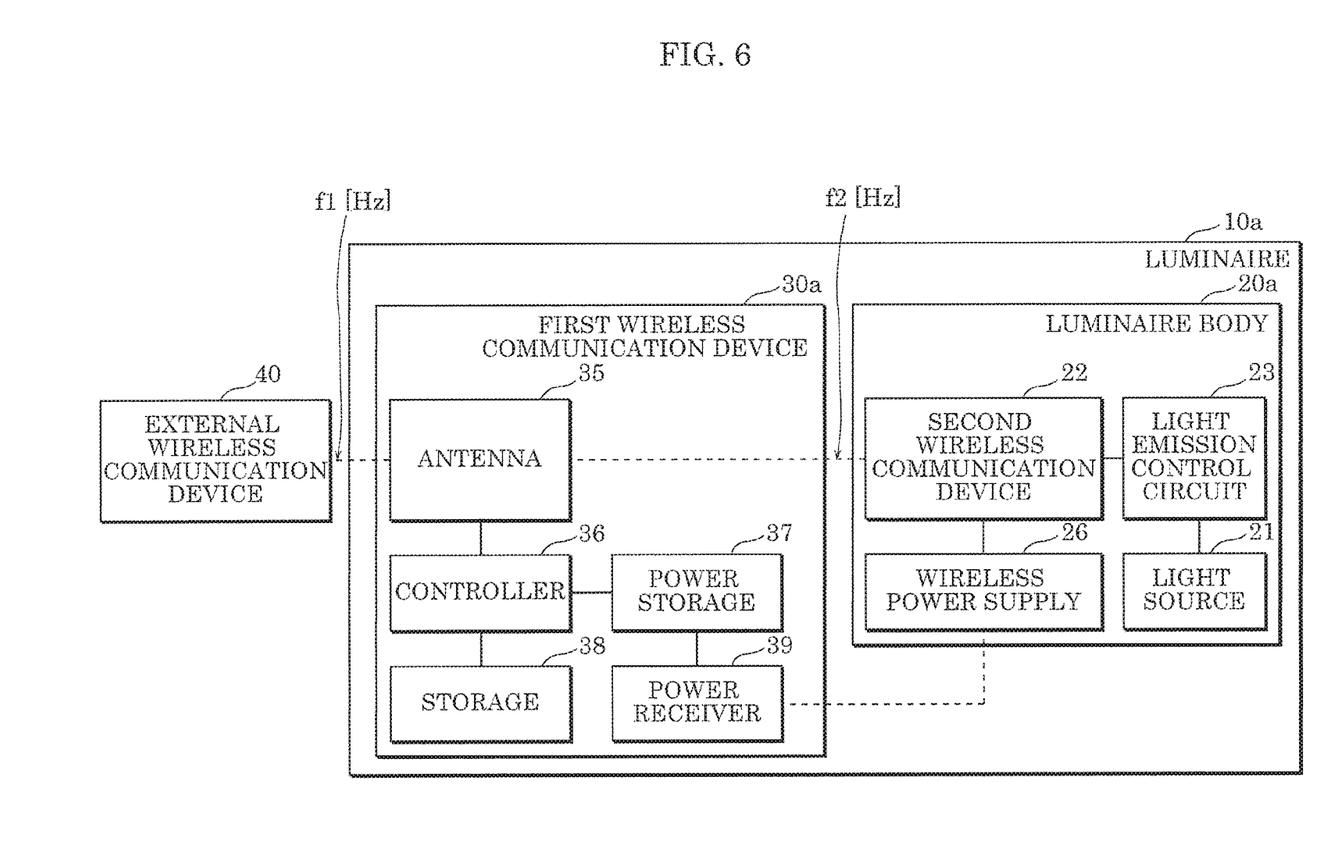
FIG. 6 is a block diagram illustrating a functional configuration of a luminaire according to Embodiment 2.

In Embodiment 1, power storage 37 stores electrical power generated by photoelectric converter 34 or the thermoelectric converter. Power storage 37, however, may store electrical power wirelessly supplied from luminaire body 20. In Embodiment 2, a luminaire according to Embodiment 2 will be described. FIG. 6 is a block diagram illustrating a functional configuration of the luminaire according to Embodiment 2.

It should be noted that the following description of Embodiment 2 will be centered on differences from Embodiment 1, and the matters already described in Embodiment 1 will be omitted.

As illustrated in FIG. 6, luminaire 10a according to Embodiment 2 includes luminaire body 20a and first wireless communication device 30a. Luminaire body 20a includes wireless power supply 26. First wireless communication device 30a includes power receiver 39 that receives electrical power from wireless power supply 26.

Examples of a wireless power supply technique include an electromagnetic radiation technique, a magnetic resonance technique, and an electromagnetic induction technique. When the electromagnetic radiation technique is used for wireless power supply, power receiver 39 is an antenna for receiving electrical power, and wireless power supply 26 includes an antenna for supplying electrical power. In this case, a frequency of a wireless power supply signal may be in a frequency band that does not interfere with carrier frequency f1 and carrier frequency f2.

Moreover, when the magnetic resonance technique or electromagnetic induction technique is used for wireless power supply, power receiver 39 is a coil element for receiving electrical power, and wireless power supply 26 includes a coil element for supplying electrical power.

Although wireless power supply 26 may always supply electrical power while luminaire 10a is operating, for example, wireless power supply 26 supplies electrical power only when an amount of electrical power stored in power storage 37 (e.g., a voltage between the terminals of a secondary battery) is less than or equal to a predetermined value. Specifically, controller 36 of first wireless communication device 30a monitors the amount of electrical power stored in power storage 37, and transmits, when determining that the amount of electrical power is less than or equal to the predetermined value, the second control signal instructing wireless power supply to wireless power supply 26, using antenna 35. Power supply is selectively performed only when an amount of stored electrical power is small, by second wireless communication device 22 receiving such a second control signal.

Advantageous Effects Etc. of Embodiment 2

As described above, luminaire body 20a of luminaire 10a includes wireless power supply 26. First wireless communication device 30a includes power receiver 39 that receives electrical power from wireless power supply 26, and power storage 37 stores electrical power obtained by power receiver 39.

With this, luminaire 10a allows first wireless communication device 30a to operate, using wireless power supply.

Embodiment 3

First Example of Luminaire According to Embodiment 3

Figure 7:
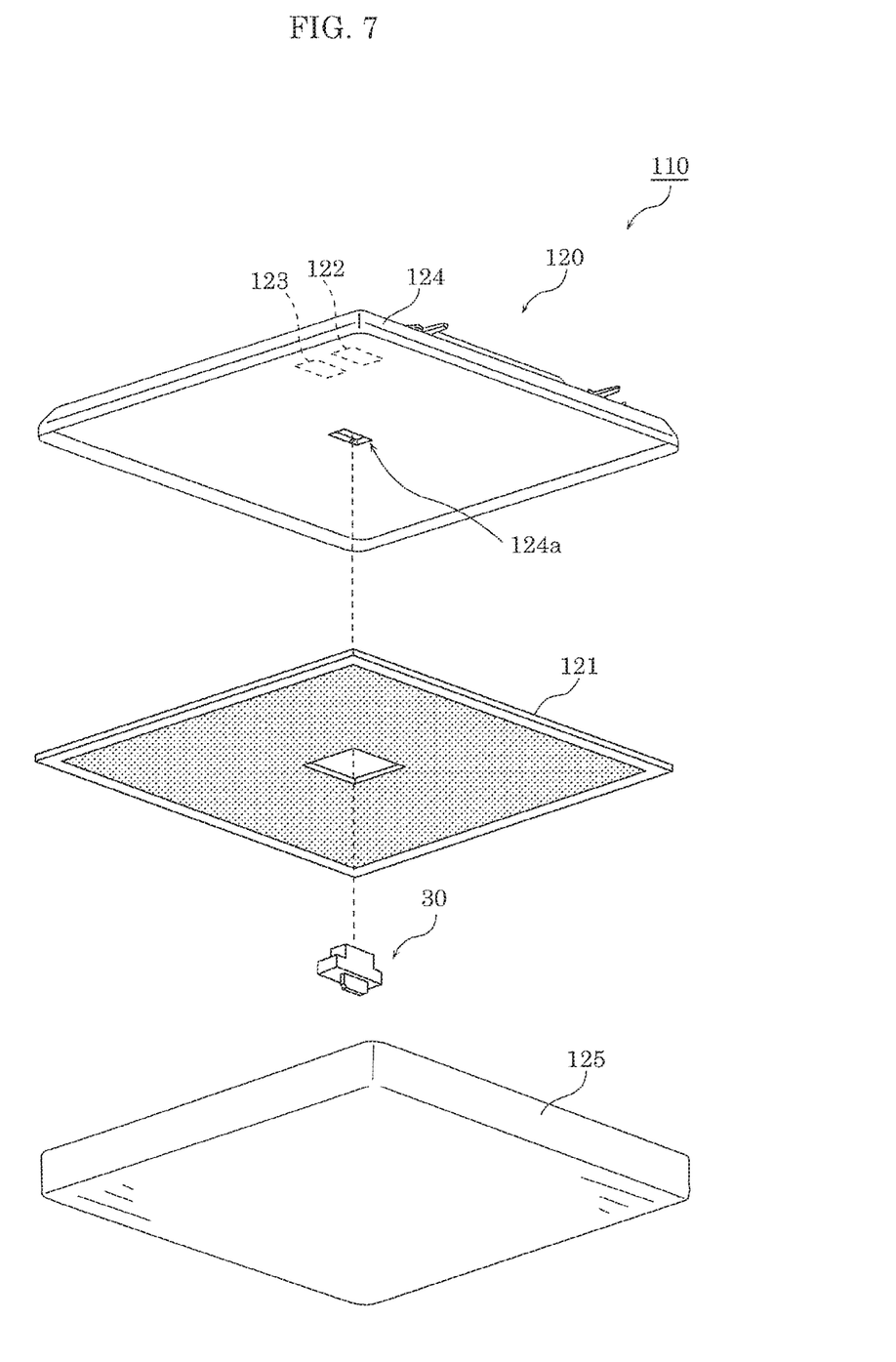
FIG. 7 is a diagram (exploded perspective view) illustrating a first example of a luminaire according to Embodiment 3.

Although luminaire 10 (or luminaire 10a) is described as an elongated indoor luminaire in Embodiments 1 and 2, the present disclosure may be implemented as a luminaire having another shape or as a luminaire for another use. In Embodiment 3, a luminaire having another configuration will be described. FIG. 7 is a diagram (exploded perspective view) illustrating a first example of a luminaire according to Embodiment 3.

Luminaire 110 illustrated in FIG. 7 is an indoor luminaire having a rectangular shape (substantially square shape) in a plan view. Luminaire 110 includes luminaire body 120 and first wireless communication device 30. Luminaire body 120 includes light source 121, second wireless communication device 122, light emission control circuit 123, and case 124 that houses second wireless communication device 122 and light emission control circuit 123. Second wireless communication device 122 receives the second control signal wirelessly transmitted. Light emission control circuit 123 is electrically connected to second wireless communication device 122, and controls a light emission state of light source 121 according to the second control signal received by second wireless communication device 122. First wireless communication device 30 is removably attached to recess portion 124a of luminaire body 120.

In such luminaire 110, if the user changes the position of first wireless communication device 30, it is possible to improve the wireless communication performance of first wireless communication device 30.

It should be noted that luminaire 110 includes same first wireless communication device 30 as luminaire 10 or luminaire 10a. In other words, first wireless communication device 30 is shared by luminaire 110 and luminaire 10 (or luminaire 10a).

If first wireless communication device 30 is shared in the above manner, it is not necessary to newly design first wireless communication device 30 when a new model of luminaire is developed, which promotes efficiency in design and reduces the costs of development.

Second Example of Luminaire According to Embodiment 3

Figure 8:
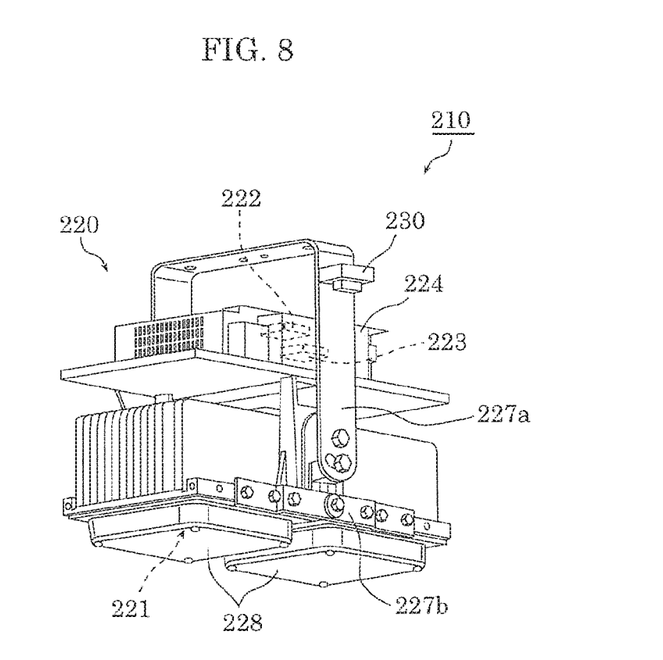
FIG. 8 is a diagram (perspective view) illustrating a second example of the luminaire according to Embodiment 3.
Figure 9:
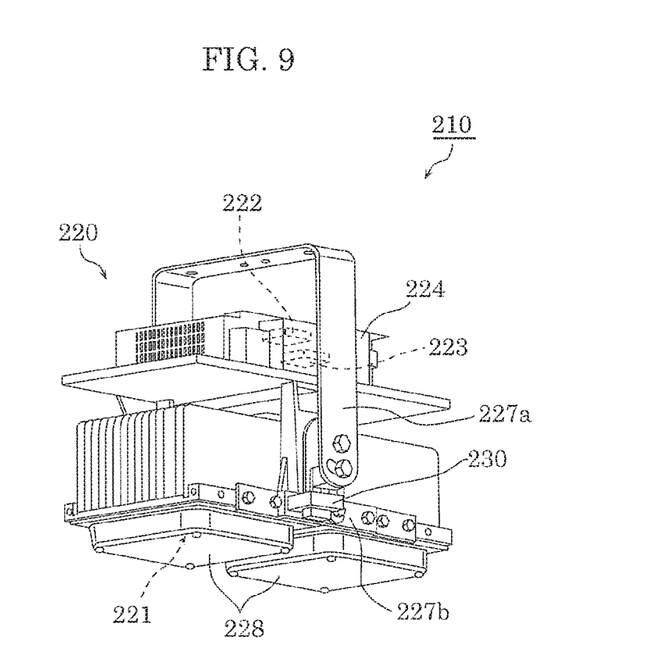
FIG. 9 is another diagram (perspective view) illustrating the second example of the luminaire according to Embodiment 3.

FIGS. 8 and 9 each are a diagram (perspective view) illustrating a second example of a luminaire according to Embodiment 3. Luminaire 210 illustrated in FIG. 8 and FIG. 9 is an overhead luminaire attached to the ceiling of a gym or a concert hall etc.

Luminaire 210 includes luminaire body 220 and first wireless communication device 230. Luminaire body 220 includes light source 221, second wireless communication device 222, light emission control circuit 223, and case 224 that houses second wireless communication device 222 and light emission control circuit 223. Second wireless communication device 222 receives the second control signal wirelessly transmitted. Light emission control circuit 223 is electrically connected to second wireless communication device 222, and controls a light emission state of light source 221 according to the second control signal received by second wireless communication device 222. Moreover, luminaire body 220 includes first frame 227a for attaching luminaire 210 to the ceiling, and second frame 227b that holds two lamps 228.

First wireless communication device 23 receives the first control signal wirelessly transmitted from the outside of luminaire body 220, and wirelessly transmits the second control signal in response to the first control signal. In addition, first wireless communication device 230 is removably attached to luminaire body 220. First wireless communication device 230 has a magnet as an attachment structure, and is attached to, for example, first frame 227a of luminaire body 220 in FIG. 8. In contrast, in FIG. 9, first wireless communication device 230 is attached to second frame 227b of luminaire body 220.

In such luminaire 210, if the user changes the position of first wireless communication device 230, it is possible to improve the wireless communication performance of first wireless communication device 230.

Third Example of Luminaire According to Embodiment 3

Figure 10:
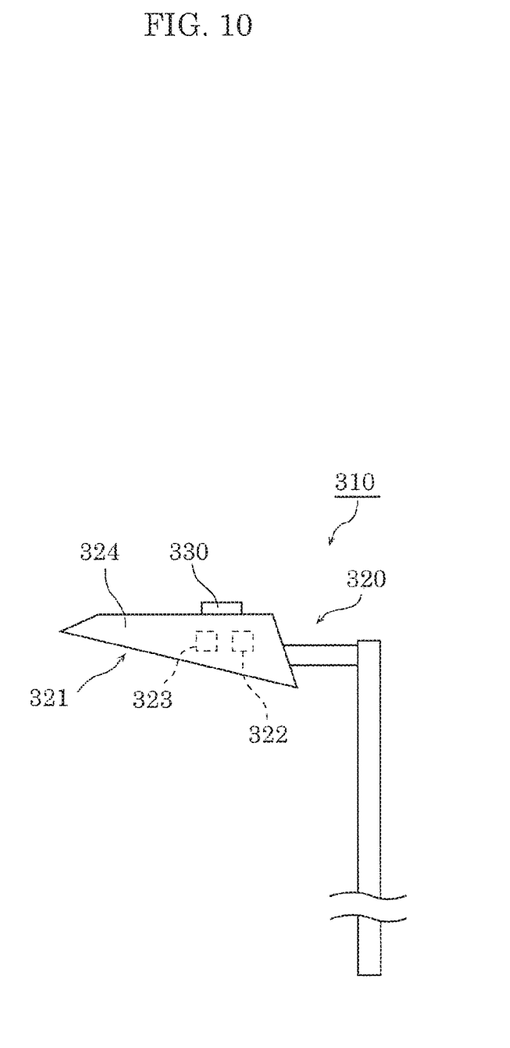
FIG. 10 is a diagram (side view) illustrating a third example of a luminaire according to Embodiment 3.

FIG. 10 is a diagram (side view) illustrating a third example of a luminaire according to Embodiment 3. Luminaire 310 illustrated in FIG. 10 is a street lamp that is used outdoors.

Luminaire 310 includes luminaire body 320 and first wireless communication device 330. Since luminaire 310 is used outdoors, each of luminaire body 320 and first wireless communication device 330 has a waterproof structure.

Luminaire body 320 includes light source 321, second wireless communication device 322, light emission control circuit 323, and case 324 that houses second wireless communication device 322 and light emission control circuit 323. Second wireless communication device 322 receives the second control signal wirelessly transmitted. Light emission control circuit 323 is electrically connected to second wireless communication device 322, and controls a light emission state of light source 321 according to the second control signal received by second wireless communication device 322.

First wireless communication device 330 receives the first control signal wirelessly transmitted from the outside of luminaire body 320, and wirelessly transmits the second control signal in response to the first control signal. In addition, first wireless communication device 330 is removably attached to luminaire body 320. First wireless communication device 330 has a magnet as an attachment structure, and is attached to, for example, case 324 in FIG. 10.

In such luminaire 310, if the user changes the position of first wireless communication device 330, it is possible to improve the wireless communication performance of first wireless communication device 330. Moreover, since first wireless communication device 330 attached to the outside of luminaire 310 has a power source as with above-described first wireless communication device 30, first wireless communication device 330 need not receive electrical power from luminaire body 320. In other words, it is not necessary to pull a power supply cable from luminaire body 320 to first wireless communication device 330, and thus the waterproof mechanism of luminaire body 320 is simplified.

The luminaires according to Embodiment 3 are described above. It should be noted that the present disclosure may be implemented as a luminaire other than the luminaires described thus far. For example, the present disclosure may be implemented as a spotlight or a downlight etc. Moreover, the present disclosure may be implemented as a luminaire for direct illumination or a luminaire for indirect illumination.

Other Embodiments

Although the embodiments are described above, the present disclosure is not limited to the aforementioned embodiments.

For example, although the recess and protrusion portion and the magnet each are illustrated as the attachment structure in the aforementioned embodiments, a specific configuration of the attachment structure is not particularly limited. For example, the attachment structure may be a locking portion for which a locking claw or a hook etc. is used, or an attachment structure for which screws and screw holes are used.

Moreover, the wireless communication standards described in the aforementioned embodiments are not particularly limited. Examples of the wireless communication standards include specified low power radio, Zigbee (registered trademark), Bluetooth (registered trademark), or Wireless LAN (local area network).

Furthermore, although the light-emitting module including the LED chip is used as the light source in the aforementioned embodiments, a configuration of the light source is not particularly limited. For example, the light source may be, instead of the light-emitting module including the LED chip, a fluorescent tube, a metal halide lamp, a sodium lamp, a halogen lamp, a xenon lamp, or a neon tube. In addition, the light source may be an inorganic electroluminescent lamp, an organic electroluminescent lamp, a chemical luminescent lamp (chemical light emitter), or a semiconductor laser, etc.

Moreover, in the aforementioned embodiments, the controller included in each of, for example, the external wireless communication device, the first wireless communication device, the second wireless communication device, and the wireless power supply may be configured as dedicated hardware or realized by executing a software program suitable for each of the structural components. Each structural component may be realized by a program execution unit, such as a CPU or a processor, loading and executing a software program stored in a storage medium, such as a hard disk or a semiconductor memory.

Furthermore, the controller may be a circuit (or an integrated circuit). These circuits may be configured as a single circuit as a whole or may be individual circuits. In addition, these circuits may be general-purpose circuits or dedicated circuits.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A luminaire, comprising:
  a luminaire body; and
  a first wireless communication device that receives a first control signal wirelessly transmitted from an outside of the luminaire body, and wirelessly transmits a second control signal in response to the first control signal,
  wherein the luminaire body includes:
    a light source;
    a second wireless communication device that receives the second control signal wirelessly transmitted by the first wireless communication device;

a light emission control circuit that is electrically connected to the second wireless communication device, and controls a light emission state of the light source according to the second control signal received by the second wireless communication device; and a case that, with or without a cover, houses the second wireless communication device and the light emission control circuit, and the first wireless communication device is attached to the luminaire body.

2. The luminaire according to claim 1,
wherein the first wireless communication device is removably attached to the luminaire body.

3. The luminaire according to claim 2,
wherein the luminaire body includes attachment structures, to each of which the first wireless communication device is configured to be removably attached.

4. The luminaire according to claim 1,
wherein the first wireless communication device includes a power storage that is a power source of the first wireless communication device.

5. The luminaire according to claim 4,
wherein the first wireless communication device includes a power generator, and
the power storage stores electrical power generated by the power generator.

6. The luminaire according to claim 5,
wherein the power generator is a photoelectric converter.

7. The luminaire according to claim 6,
wherein the first wireless communication device includes a housing body that houses the photoelectric converter in a state in which a light-receiving surface of the photoelectric converter is viewable from an outside of the housing body.

8. The luminaire according to claim 7,
wherein the first wireless communication device includes a light reflector that reflects light to the light-receiving surface.

9. The luminaire according to claim 8,
wherein the first wireless communication device includes an antenna, and
the light reflector is plate-shaped, erected on the housing body, and contains the antenna.

10. The luminaire according to claim 8,
wherein the light reflector reflects light emitted by the light source to the light-receiving surface.

11. The luminaire according to claim 5,
wherein the power generator is a thermoelectric converter.

12. The luminaire according to claim 4,
wherein the luminaire body includes a wireless power supply,
the first wireless communication device includes a power receiver that receives electrical power from the wireless power supply, and
the power storage stores the electrical power obtained by the power receiver.

13. The luminaire according to claim 1,
wherein a carrier frequency of the first control signal is different from a carrier frequency of the second control signal.

14. The luminaire according to claim 13,
wherein the carrier frequency of the first control signal is lower than the carrier frequency of the second control signal.

15. The luminaire according to claim 1,
wherein the first wireless communication device is attached to the case of the luminaire body.

16. The luminaire according to claim 15,
wherein the case has an elongated shape, and
the first wireless communication device is attached to a longitudinal end of the case.

17. The luminaire according to claim 15, further comprising:
the cover, the cover being a light-transmissive cover that covers the light source and the first wireless communication device.

18. A luminaire, comprising:
a luminaire body; and
a first wireless communication device that receives a first control signal wirelessly transmitted from an outside of the luminaire body, and wirelessly transmits a second control signal in response to the first control signal,
wherein the luminaire body includes:
a light source;
a second wireless communication device that receives the second control signal wirelessly transmitted by the first wireless communication device;
a light emission control circuit that is electrically connected to the second wireless communication device, and controls a light emission state of the light source according to the second control signal received by the second wireless communication device; and
a case that, with or without a cover, houses the second wireless communication device and the light emission control circuit, and
the first wireless communication device is in an interior space of the luminaire body defined by the case and the cover.

* * * * *